(12) United States Patent
Kraus et al.

(10) Patent No.: US 11,835,087 B2
(45) Date of Patent: Dec. 5, 2023

(54) NON-LOCATING BEARING ASSEMBLY

(71) Applicant: AKTIEBOLAGET SKF, Gothenburg (SE)

(72) Inventors: Sebastian Kraus, Schwanfeld (DE); Helmut Hauck, Euerbach (DE); Juergen Barthelme, Grettstadt (DE); Andreas Herbert Kraus, Bergrheinfeld (DE); Hans-Juergen Friedrich, Königsberg-Römershofen (DE); Alexander Dilje, Schweinfurt (DE); Alfred Radina, Poppenlauer (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/748,692

(22) Filed: May 19, 2022

(65) Prior Publication Data
US 2022/0389955 A1 Dec. 8, 2022

(30) Foreign Application Priority Data
Jun. 8, 2021 (DE) .......................... 102021205782.9

(51) Int. Cl.
*F16C 19/06* (2006.01)
*F16C 35/077* (2006.01)
*F16C 25/08* (2006.01)

(52) U.S. Cl.
CPC ............ *F16C 19/06* (2013.01); *F16C 25/083* (2013.01); *F16C 35/077* (2013.01)

(58) Field of Classification Search
CPC ...... F16C 19/06; F16C 25/083; F16C 35/077; F16C 2226/60; F16C 25/06
USPC .......................................................... 415/229
See application file for complete search history.

(56) References Cited

U.S. PATENT DOCUMENTS

| 3,323,785 | A  | * | 6/1967 | Mather ................... F16C 27/08 |
| | | | | 267/167 |
| 2010/0014794 | A1 | * | 1/2010 | Iida ........................ F16C 27/066 |
| | | | | 384/489 |
| 2011/0081231 | A1 | * | 4/2011 | Hoelzer ................ F16C 35/077 |
| | | | | 415/119 |
| 2017/0114833 | A1 | * | 4/2017 | Herbst .................... F16C 19/06 |

* cited by examiner

*Primary Examiner* — Yi-Kai Wang
(74) *Attorney, Agent, or Firm* — J-TEK LAW PLLC; Scott T. Wakeman; Mark A. Ussai

(57) ABSTRACT

A non-locating bearing assembly includes a bearing unit configured to support a rotating component relative to a stationary component, the bearing unit including a stationary bearing ring and a rotatable bearing ring that are rotatable with respect to each other. The rotatable bearing ring is fixedly connectable to the rotating component, and the stationary bearing ring is mountable in the stationary component in a rotationally fixed but axially displaceable manner. A connector is provided between the stationary bearing ring and the stationary component to connect the bearing ring to the stationary component in an axially displaceable but substantially rotationally fixed manner, and the connection is provided by a combination of a friction fit and an interference fit acting in the circumferential direction.

11 Claims, 4 Drawing Sheets

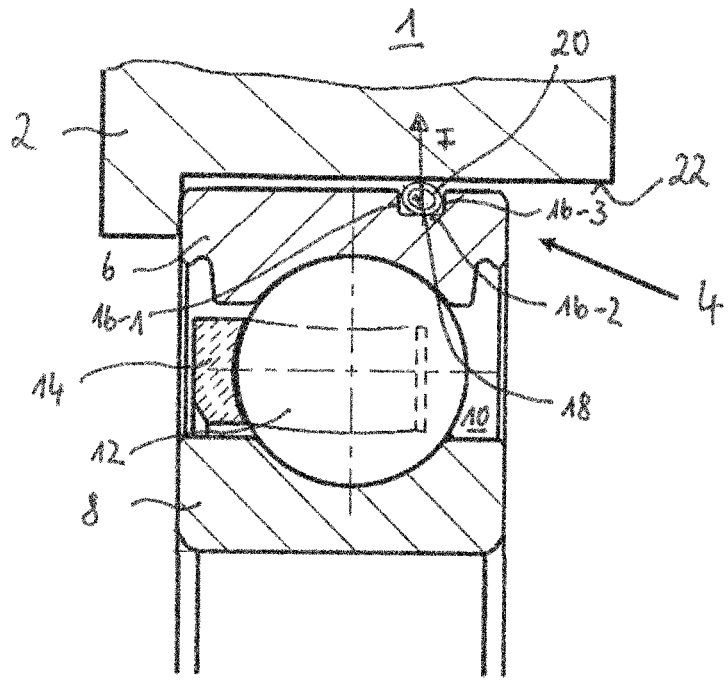
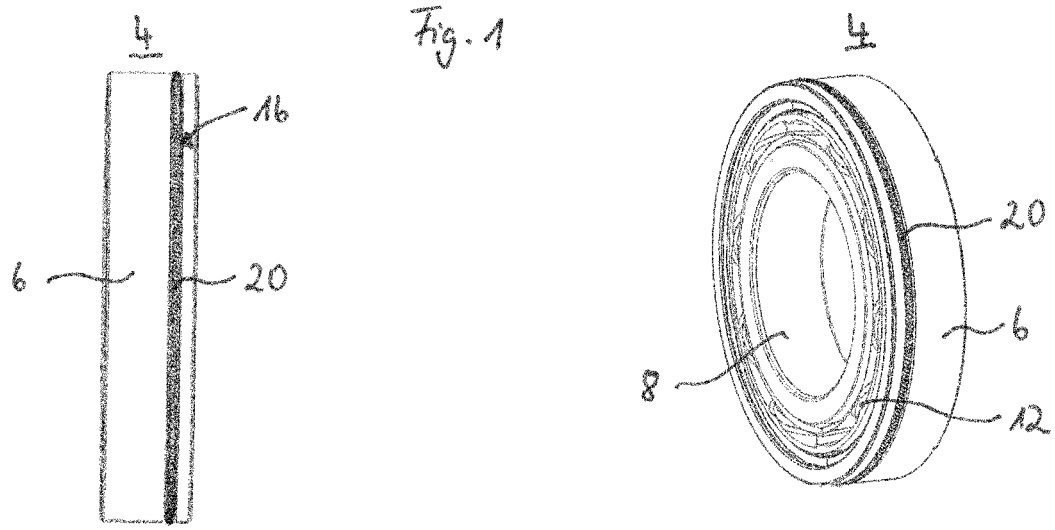
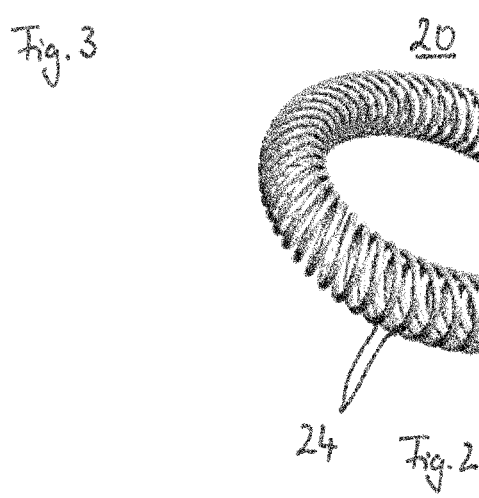

NON-LOCATING BEARING ASSEMBLY

CROSS-REFERENCE

This application claims priority to German patent application no. 10 2021 205 782.9 filed on Jun. 8, 2021, the contents of which are fully incorporated herein by reference.

TECHNOLOGICAL FIELD

The present disclosure is directed to a non-locating bearing assembly having a rotatable bearing ring, a fixed bearing ring, an element supporting the fixed bearing ring and a connecting element configured to reduce or eliminate rotation between the fixed bearing ring and the element supporting the fixed bearing ring.

BACKGROUND

Non-locating bearings are always used when a relative axial movement is required between a housing and a bearing outer ring, or between a shaft and a bearing inner ring, or between the bearing rings and elements adjacent to the bearing. However, the axial movability often also entails a rotational movability, in particular when the components concerned are made of materials having different coefficients of thermal expansion. However, this rotational movement, in particular a rotating or creeping of the bearing rings instead of a purely axial movement, can damage the component surrounding the bearing element, which makes necessary an exchange of the component or of the bearing. In order to avoid such an unwanted movement, rubber rings are usually used that increase the friction between bearing ring and the surrounding component so that the rotational movement of the bearing ring is greatly limited or prevented. However, this friction-fit retaining function is dependent on the state of the rubber rings. Indeed over time the state of the rubber rings changes due to aging, wear, or also environmental conditions, such as, for example, an oil environment, so that the retaining function is ultimately lost.

SUMMARY

An aspect of the present disclosure is therefore to provide a non-locating bearing assembly that has an improved retaining function against unwanted rotation or creeping.

In the following a non-locating bearing assembly is disclosed that includes a bearing unit that is configured to support a rotating component relative to a stationary component, the bearing unit including a stationary bearing ring and a rotatable bearing ring that are rotatable with respect to each other. Here the rotating bearing ring is fixedly connectable to the rotating component, and the stationary bearing ring is attachable in the stationary component in a rotationally fixed but axially displaceable manner. In order to prevent unwanted movements, in particular a circumferential rotation, and thus a co-rotation of the stationary bearing ring with the rotatable bearing ring, a connecting element is furthermore arrangeable on the stationary bearing ring, or interacts therewith such that the stationary bearing ring is attachable to the stationary component in an essentially rotationally-fixed manner, wherein the connecting element provides the essentially rotationally-fixed attaching via a combination of friction fit and interference fit acting in the circumferential direction. Here the additional component of the interference fit ensures an improved retention of the bearing or of the stationary bearing ring in the stationary component. Here the interference-fit component ensures in particular that a co-rotation is reliably prevented even when the bearing assembly is used in an oil environment.

Such a non-locating bearing assembly is preferred in particular in applications, such as, for example, shaft bearing assemblies, in which the outer ring is to be attached in a housing in a rotationally fixed manner, but the outer ring is axially displaceable. Such applications are necessary in particular with non-locating/locating bearing assemblies of shafts in order to compensate for differences in the coefficients of thermal expansion of the shaft, bearing, and housing.

According to a further preferred exemplary embodiment, the stationary bearing ring or the stationary component includes at least one circumferential groove in which the connecting element is received in a friction-fit manner. The connecting element furthermore includes at least one element for securing against rotation that interacts in an interference-fit manner with the element receiving the bearing unit and/or the bearing ring. Circumferential grooves are very simple to introduce into the corresponding component during manufacturing or already are present on the corresponding components as standard so that such a design provides a particularly cost-effective and easy-to-manufacture possibility to attach the stationary bearing ring in the stationary component in a rotationally fixed manner. Here the additional rotation-securing element ensures that even with long-term use or with unfavorable environmental conditions, such as, for example, an oil environment that would reduce a friction fit, a rotationally fixed connection remains.

According to a further preferred exemplary embodiment, the connecting element is a worm spring having a plurality of windings, which is received in the circumferential groove in a friction-fit manner and which exerts a radial spring force on an abutment surface on the stationary component or the bearing ring, wherein the windings of the worm spring are configured to engage in irregularities in the groove and/or on the abutment surface so that a connection acting in the circumferential direction in an interference-fit manner is formed. Processing marks, which ensure a certain irregularity or roughness, arise during the production of grooves or even during the manufacture of the stationary component or bearing ring. These irregularities can interact with the windings of the worm spring such that these windings hook onto the irregularities and thereby provide an interference fit that provides an additional securing against rotation. In addition, due to the radial contact force of the worm spring and a corresponding force application in the circumferential direction an embedding of the windings of the worm spring into the groove or the abutment surface can be effected so that an interference fit is also provided by the embedding of the worm spring itself.

As mentioned above, the irregularities can arise as a result of the manufacturing process of the bearing or of the stationary component, but it is also possible to actively introduce such irregularities in order to provide a corresponding gripping possibility for the windings of the worm spring.

According to a further preferred exemplary embodiment, the connecting element is annular, and the at least one element securing against rotation is a radially outwardly or radially inwardly projecting projection that is received in at least one receptacle such that an interference-fit connection is provided. Here the receptacle is formed on the corresponding counter-element. That is, when the connecting element is attached to the bearing ring in a friction-fit manner, then the stationary component is the counter-element that includes the receptacle. The receptacle can advantageously be an axially extending groove so that the axial mobility remains ensured. It is particularly advantageous when projection and receptacle are formed to be complementary. Small movements in the rotational direction between the stationary bearing ring and the bearing carrier can thereby also be prevented.

Furthermore, the connecting element can be configured as a snap ring that can be attached particularly easily to the element receiving the connecting element, in particular in the groove. In order to enhance the interference fit and the friction fit, the connecting element can also spring radially outward or radially inward, wherein the spring element is preloaded toward the counter-element receiving the projection. The projection can thereby be prevented from being pressed out from the receptacle.

According to a further preferred exemplary embodiment, in particular in order to increase the friction-fit force, the connecting element can include radially resilient tabs that are configured to snap into the at least one groove and/or mold-in or be molded into the groove. In addition to the increased friction fit, such tabs can of course also embed into the material of the groove or interact with irregularities in the groove so that the friction force is increased by an interference-fit component. Such above-described connecting elements can be manufactured both from plastic or from metal, in particular from a spring steel.

If plastic is used, a further exemplary embodiment is advantageous in which the connecting element is configured as a plastic ring received in the groove, wherein the plastic ring is injected into the groove, so that the friction fit between the plastic ring and the groove is increased. A combination of friction fit and interference fit is also provided here, since during the injecting process the plastic fills all irregularities of the groove so that, depending on the shaping of the irregularity, not only is the friction increased but interference-fit elements can also be formed. This is possible in particular when irregularities in the groove are actively introduced, or roughnesses are taken into account during the forming of the groove.

The groove itself can be formed at a plurality of points of the bearing ring, wherein a plurality of grooves of identical or different shape and arrangement can also be present. Thus, for example, at least one of the at least one groove can be formed in a radial surface of the bearing ring and have a U-shape in cross-section. Alternatively or additionally, the groove can also be formed at a transition from a radial surface of the bearing ring to an end surface of the bearing ring and be at least partially open toward the end surface. In cross-section the groove then has a L-shape or slight hook shape. Furthermore, the at least one of the at least one groove can be a seal-element-receiving groove already provided on the bearing ring, which seal-element-receiving groove is usually introduced as standard for receiving a seal element in the bearing ring. Here such a seal-element-receiving groove is usually facing the bearing interior so that a combination with the above-described exemplary embodiment with tabs snapping into the groove is particularly preferred in this case.

According to a further preferred exemplary embodiment, the groove and/or the connecting element is formed oval or wavy so that a certain interference-fit connection is already provided via the design of the groove or connecting element.

According to a very simple exemplary embodiment, it is also possible to exploit or further develop a certain ovality of the bearing ring and of the housing so that the ovality of bearing ring, connecting element, and housing provides a locking effect acting in the circumferential direction. In this case a "projection" is rather to be understood as a radially-outwardly or radially inwardly acting bulge that is provided by the ovality of the connecting element. The receptacle can then also be provided by an additional ovality or waviness of the counter-element.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

FIG. 1 is a sectional view of a non-locating bearing assembly including a connecting element according to a first embodiment of the present disclosure.

FIG. 2 is a perspective view of the connecting element of FIG. 1.

FIG. 3 is a side elevational view of the non-locating bearing assembly of FIG. 1.

FIG. 4 is a perspective view of the non-locating bearing assembly of FIG. 1.

DETAILED DESCRIPTION

Figure 5:
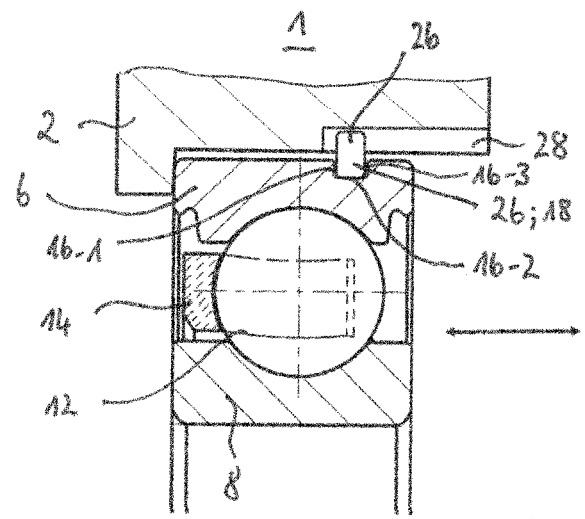
FIG. 5 is a sectional view of a non-locating bearing assembly including a connecting element according to a second embodiment of the present disclosure.

In the following, identical or functionally equivalent elements are designated by the same reference numbers.

FIGS. 1 to 4 show a first exemplary embodiment of a non-locating bearing assembly 1 in various views. Here FIG. 1 is a sectional view through the non-locating bearing assembly 1, wherein the non-locating bearing assembly 1 includes a bearing unit 4 received in a housing 2. The bearing unit 4 includes an outer ring 6 and an inner ring 8 that form a bearing interior 10 between them in which rolling elements, in the case depicted balls 12, are received so that the outer ring 6 and the inner ring 8 are rotatable with respect to each other. Furthermore, the balls 12 are received in a cage 14 and are uniformly spaced thereby. Of course, other types of rolling-element bearings are equally possible.

The depicted non-locating bearing assembly 1 is furthermore configured such that the outer ring 6 is axially displaceable in the housing 2, while the inner ring 8 is fixedly attachable to a shaft (not depicted). Unequal thermal expansions can thereby in particular be compensated for in a shaft bearing assembly since the outer ring 6 can move axially relative to the housing 2. Such unequal thermal expansions arise in particular when housing 2 and bearing 4 are manufactured from different materials. Here for weight reasons the housing 2 is often manufactured from aluminum and the bearing ring from steel, which in operation leads to different thermal expansions and thus to problems with the fit, which can be remedied, however, by the presented combination of friction fit and interference fit.

In particular, a so-called co-rotation of the bearing ring 6 with the inner ring 8, i.e., a circumferential movement of the outer ring 6 relative to the housing 2, is to be prevented. Such rotational movements or such a co-rotation can damage the housing and bearing such that the elements must be replaced.

In order to prevent such a co-rotation or a rotational movement, a groove 16 is provided on the outer ring 6, in which groove 16 a connecting element 18 is received, which in the depicted case is a so-called worm spring 20. The worm spring 20 applies a radially outwardly acting spring force F on the housing 2, wherein a friction fit is achieved between the worm spring 20 and the housing inner wall 22. In addition, the worm spring 20 abuts against the side walls 16-1, 16-2, and 16-3 of the groove 16 so that a friction fit between the worm spring 20 and the groove 16 is also achieved here.

As can be seen in particular in FIG. 2, the worm spring 20 includes a plurality of windings 24 and is preferably manufactured from a metallic material. These windings 24 ensure that the worm spring 20 embeds in the abutment surface 22 formed by the inner side of the housing 2, or interacts with irregularities that arise during the manufacture of the housing 2, so that in addition to a friction force, an interference-fit component also prevents a rotation of the outer ring 6 relative to the housing 2. Similarly, the windings 24 also claw or dig into the side walls 16-1, 16-2, 16-3 of the groove 16 so that here also the friction fit is reinforced by interference-fit components, and the bearing ring 6 is prevented from a co-rotation. FIGS. 3 and 4 show further views of the bearing unit 4 including the worm spring 20 received in the groove 16 of the bearing outer ring 6.

Figure 6:
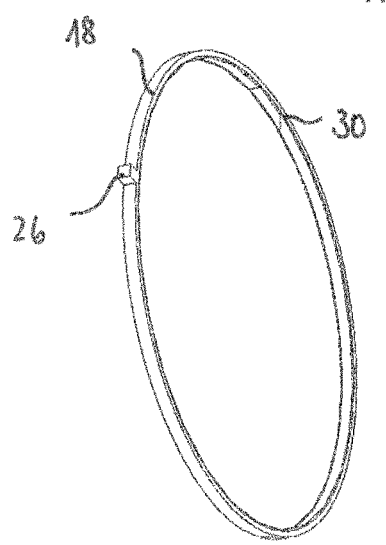
FIG. 6 is a perspective view of the connecting element of FIG. 5.
Figure 7:
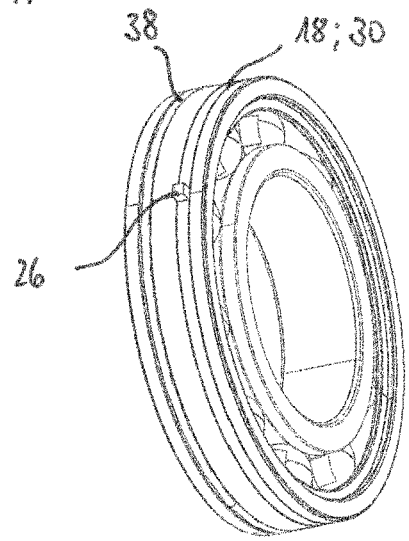
FIG. 7 is a perspective view of the non-locating bearing assembly of FIG. 5.

FIGS. 5 to 7 illustrate two further preferred exemplary embodiments for a non-locating bearing assembly 1. Here in a manner analogous to FIG. 4, FIG. 5 in turn shows a sectional view through the non-locating bearing assembly 1 in which the outer ring 6 of the bearing unit 4 is in turn disposed axially movable but rotationally immovable in the housing 2. In order to prevent a co-rotation of the bearing ring 6, a connecting element 18 is introduced into the groove 16, which connecting element 18 interacts on the one hand in a friction-fit manner with the groove walls 16-1, 16-2, 16-3 and in addition includes an element securing against rotation in the form of a projection 26, which engages in a receptacle 28 in the form of a groove, in the housing 2. The groove 28 in the housing is configured as an axially extending longitudinal groove so that an axial movability of the bearing ring 6 is nonetheless possible.

As depicted in particular in FIGS. 6 and 7, the connecting element 18 including the projection 26 can be configured as a one-piece plastic ring 30 that is injected into the groove 16 of the outer ring. Due to the injecting, the friction fit between the connecting element 18 in the form of a plastic ring 30 and the side walls of the groove 16 can also be increased. Of course, however, other attachment possibilities of the plastic ring 30 in the groove 16 are also possible.

Figure 8:
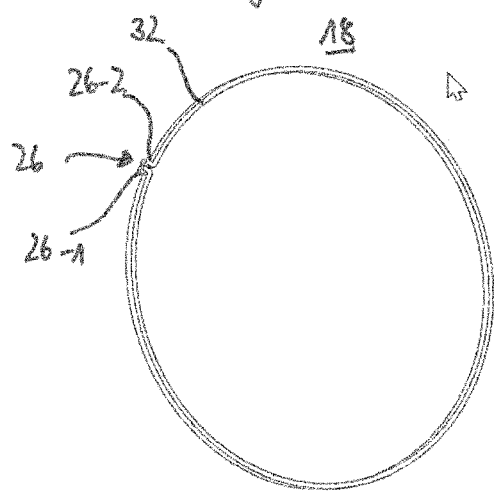
FIG. 8 is a perspective view of an alternate connecting usable with a non-locating bearing assembly according to a third embodiment of the present disclosure.
Figure 9:
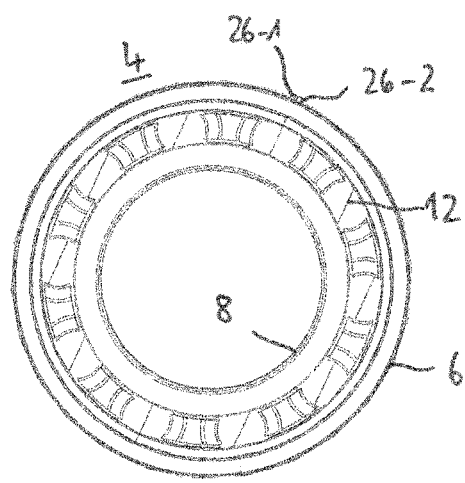
FIG. 9 is a side elevational view of a non-locating bearing assembly including the connecting element of FIG. 8.
Figure 10:
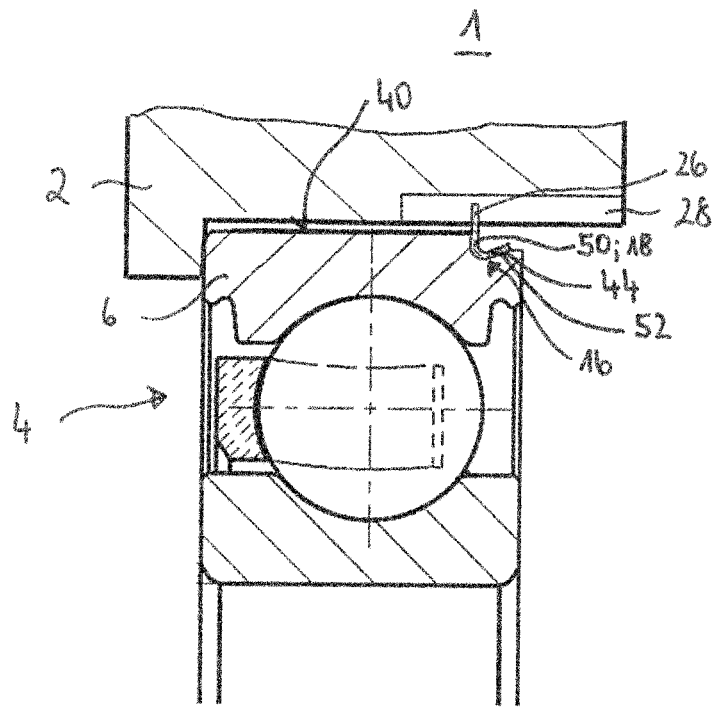
FIG. 10 is a sectional view of a non-locating bearing assembly including a connecting element according to a fourth embodiment of the present disclosure.

Thus it is also possible, for example, to form the connecting element 18 as a snap ring 32 that is snapped into the groove 16. A corresponding exemplary embodiment is depicted in FIGS. 8 and 9. Also in this exemplary embodiment a projection 26 is in turn formed that engages into the groove 28 and thus provides a rotational securing.

The snap ring 32 can in particular be manufactured from a metallic material and provide a certain spring effect radially outward so that a securing of the projection 26 in the groove 28 is ensured. Alternatively the snap ring 32 can also be configured such that it exhibits a spring effect radially inward so that the material of the snap ring abuts tightly against the groove base 16-2 and exerts a radial force inwardly against it so that the friction fit between snap ring 32 and groove 16 is increased.

As can furthermore be seen from FIGS. 8 and 9, it is preferred in particular when the opening of the snap ring 32 is formed in the region of the projection 26, wherein, for example, this can be achieved via outwardly bent metal elements 26-1, 26-2. In this case the projection 26 is then configured two-part.

It can also be seen from the view from FIG. 7 that the outer ring 6 can include not only a first groove 16, but also a second groove 38 in which a connecting element (not depicted here) can be received in the same manner. Here all connecting elements 18 described above and in the following are possible individually or in combination as connecting element 18. Thus, for example, a worm spring 20, as described in FIGS. 1 to 4, can also be received in the groove 34.

The grooves 16 or 34 are usually already present in bearing rings for non-locating bearings so that already existing non-locating bearing assemblies can also be equipped with the improved connecting element 18.

FIGS. 10 to 15 show further structural variations for a non-locating bearing assembly 1 in which other shapes of grooves 16 have been used to receive the connecting element 18. As can be seen from the sectional view of FIG. 10, the groove 16 can be configured not only as a U-shaped groove 16, including side walls 16-1, 16-2, 16-3, which is introduced in a radial surface 40 of the bearing outer ring 6, but rather the groove 16 can also be located on the edge of the radial surface 40 and be open to an end surface 42 of the bearing outer ring 6. Furthermore, the groove 16 can also include a slight undercut 44 so that the connecting element 18 can be received in the groove 16 in a particularly good friction-fit manner.

Figure 11:
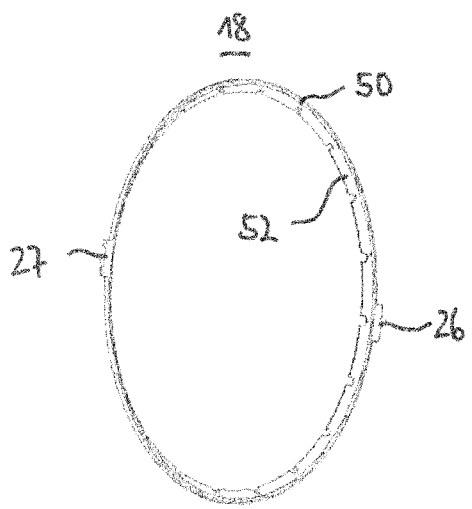
FIG. 11 is a perspective view of the connecting element of FIG. 10.
Figure 14:
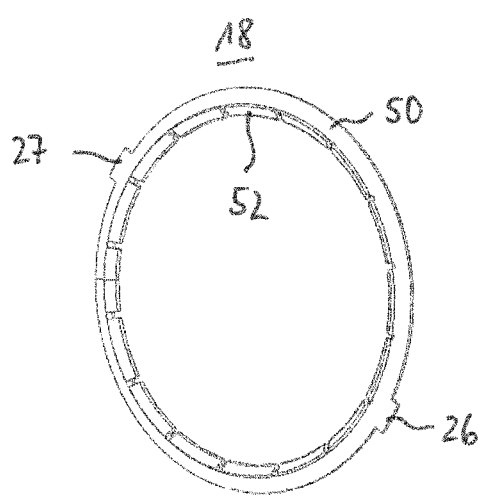
FIG. 14 is a perspective view of the connecting element FIG. 13.

In such a design of the groove 16, a connecting element 18 is advantageous in particular that is in turn configured as a continuous ring 50, which, however, is equipped with radially inwardly designed tabs 52 as can be seen in FIG. 11 or also FIG. 14. The tabs 52 are then snapped into the groove 16 and/or settle in the undercut 44 so that a particularly good friction fit is ensured between the connecting element 18 and the groove 16. It is also possible to press the tabs into the groove by a forming process. In order to furthermore prevent the co-rotation, in this design an element securing against rotation in the form of a projection 26 is also provided that can engage in a corresponding recess 28 in the housing 2.

As can furthermore be seen in FIG. 11, on this rotation-securing element 18, but also on the above-described rotation-securing elements 18, of course not only one projection 26 but rather a plurality of projections 26 and 27 can be provided that are distributed circumferentially about the ring 50. In the exemplary embodiment depicted in FIG. 11, two projections 26, 27 are depicted that lie opposite each other. However, it is also possible to provide more projections or a non-uniform distribution of the projections.

Figure 12:
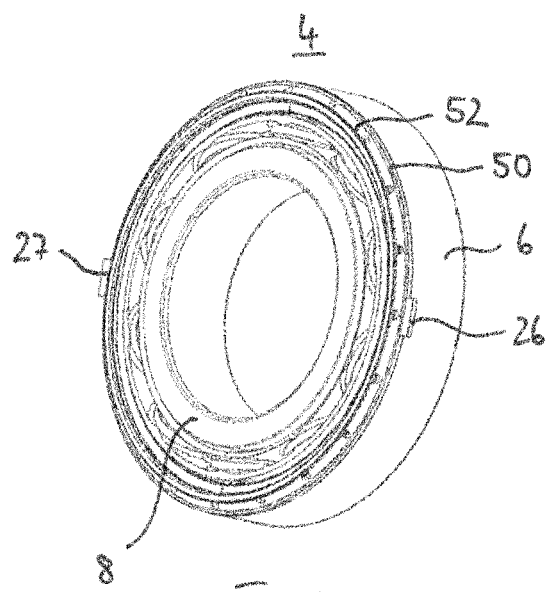
FIG. 12 is a perspective view of the non-locating bearing assembly of FIG. 10.

FIG. 12 shows a further view of the above-described exemplary embodiment in perspective view and in the assembled state.

The above-discussed connecting element 18 can be manufactured from plastic and/or metal. If a manufacturing from metal is effected, then the tabs 52 can also embed into the material of the outer ring 6 and thus increase the friction fit by further interference-fit components.

Furthermore, the connecting element 18 can also have a certain ovality, so that the bearing ring is also prevented from turning by the fact that due to the ovality, further rotation of the bearing ring 6 relative to the connecting element 18 or the housing 2 is prevented.

Figure 13:
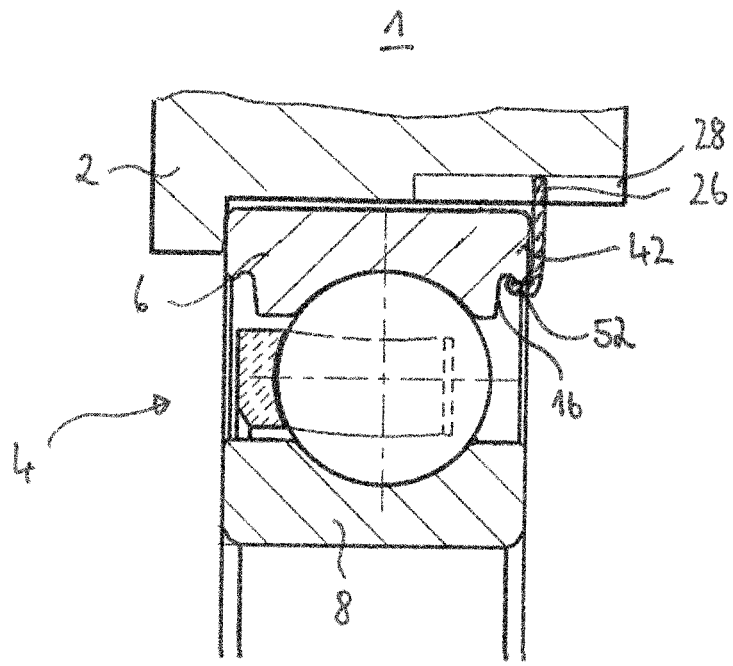
FIG. 13 is a sectional view of a non-locating bearing assembly including a connecting element according to a fifth embodiment of the present disclosure.
Figure 15:
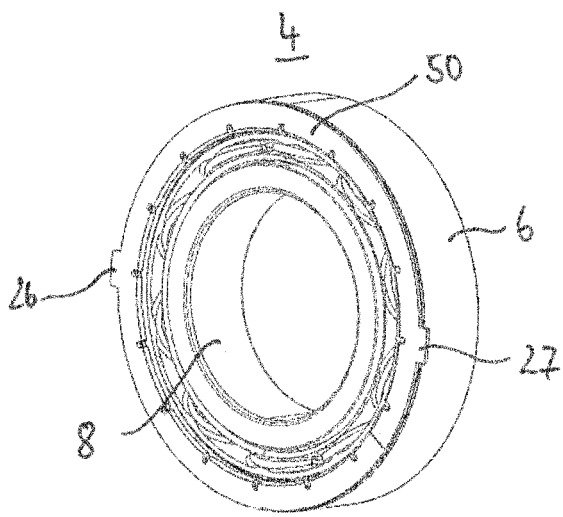
FIG. 15 is a perspective view of the non-locating bearing assembly of FIG. 13.

Instead of an additional groove 16 in the bearing outer ring 6, an already existing groove 16, such as, for example, a groove 16 for receiving a seal element for attaching the connecting element 18, can also be used. Corresponding exemplary embodiments are depicted in FIGS. 13 to 15. Here the connecting element 18, as can be seen in particular in FIG. 14, in turn includes a continuous ring 50 that includes a plurality of tabs 52 on its radially inner side. In this case these tabs 52 are configured to snap into the seal groove 16 on the bearing outer ring and to connect the connecting element 18 against rotation in a friction-fit manner to the outer ring 6. As can be seen in particular in FIG. 15, the connecting element 18 then covers the entire end surface 42 of the bearing outer ring 6 and engages with the projections 26, 27, or optionally further in corresponding receptacles 28 in the housing 2. This design can also be configured both as a metal and as a plastic element.

In addition to the exemplary embodiments depicted, a plurality of other exemplary embodiments are possible in which a securing against rotation of the outer ring in the bearing housing is also possible via a combination of friction fit and interference fit without limiting the axial movability. The exemplary embodiments depicted are preferred since they use already-existing elements on standard bearing outer rings in order to provide the corresponding retaining function.

Furthermore, it is to be noted that the above-described exemplary embodiments are equally suited for an assembly wherein the inner ring is to be attached in an axially displaceable but rotationally secure manner, while the outer ring is fixed.

In summary, with the presented non-locating bearing assembly, in particular in applications in an oil environment, the rotationally fixed connection between stationary bearing ring and stationary component can be ensured. Here the interference-fit component ensures a particularly secure rotationally fixed connection.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved non-locating bearing assembly.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Non-locating bearing assembly
2 Housing
4 Bearing unit
6 Bearing outer ring
8 Bearing inner ring
10 Bearing interior
12 Rolling element
14 Cage
16 Groove
18 Connecting element
20 Worm spring
22 Abutment surface
24 Windings of the worm spring
26, 27 Projection
28 Groove in the housing
30 Plastic ring
32 Snap ring
34 Receptacle
40 Radial surface of the bearing outer ring
42 End surface of the outer ring
44 Undercut of the groove
50 Ring element
52 Tab

What is claimed is:

1. A non-locating bearing assembly comprising:
   a bearing unit configured to support a rotating component relative to a stationary component, the bearing unit including a stationary bearing ring and a rotatable bearing ring that are rotatable with respect to each other, wherein the rotatable bearing ring is fixedly connectable to the rotating component, and the stationary bearing ring is mountable in the stationary component in a rotationally fixed but axially displaceable manner, and
   a connector between the stationary bearing ring and the stationary component configured to connect the bearing ring to the stationary component in an axially displaceable but substantially rotationally fixed manner, wherein the stationary component or the stationary ring includes at least one axially extending longitudinal groove having two facing sidewalls and the other one of the stationary component and the stationary ring includes a circumferential groove, the connector including an annular body disposed within the circumferential groove and at least one radial projection disposed within and axially displaceable along the longitudinal groove such that the stationary ring is axially displaceable and prevented from rotation by engagement between the at least one projection and at least one of the sidewalls of the longitudinal groove.

2. The non-locating bearing assembly according to claim 1, wherein:
the connector annular body is received in the circumferential groove in a friction-fit manner, and.

3. The non-locating bearing assembly according to claim 1,
wherein the connector annular body is received in the groove in a friction-fit manner, and.

4. The non-locating bearing assembly according to claim 1, wherein the connector is a snap ring.

5. The non-locating bearing assembly according to claim 1, wherein the connector is a ring that includes radially resilient tabs configured to mold or be molded into the groove to produce a friction fit is between the radially resilient tabs and the groove.

6. The non-locating bearing assembly according to claim 1, wherein the connector is manufactured from a plastic or a spring steel.

7. The non-locating bearing assembly according to claim 1, wherein the connector is a plastic ring injected into the groove.

8. The non-locating bearing assembly according to claim 1, wherein at least one of the at least one circumferential groove is formed in a radial surface of the stationary component or of the bearing ring and is U-shaped.

9. The non-locating bearing assembly according to claim 1, wherein at least one of the at least one circumferential groove is formed at a transition from a radial surface of the bearing ring to an end surface of the bearing ring and is open toward the end surface.

10. The non-locating bearing assembly according to claim 1, wherein at least one of the at least one groove is a seal-element receiving groove in the bearing ring.

11. A non-locating bearing assembly comprising:
a bearing unit that is configured to support a rotating component relative to a stationary component, the bearing unit including a stationary bearing ring and a rotatable bearing ring that are rotatable with respect to each other, wherein the rotatable bearing ring is fixedly connectable to the rotating component, and the stationary bearing ring is mountable in the stationary component in a rotationally fixed but axially displaceable manner, and
a connector between the stationary bearing ring and the stationary component for connecting the bearing ring to the stationary component in an axially displaceable but substantially rotationally fixed manner via a combination of a friction fit and an interference fit acting in the circumferential direction;
wherein the stationary component or the stationary bearing ring includes a circumferential groove, the other one of the stationary component and the stationary bearing ring has a circumferential abutment surface and the connector includes a worm spring mounted in the circumferential groove and having a plurality of windings, the worm spring being compressed radially to exert a radial spring force against the abutment surface and the plurality of windings being configured to engage with any irregularities in the groove and/or in the abutment surface to resist rotational movement.

\* \* \* \* \*